United States Patent
Pence et al.

(10) Patent No.: US 7,177,407 B2
(45) Date of Patent: Feb. 13, 2007

(54) SYSTEM AND METHOD FOR INTEGRATION OF SOFTKEYS WITH VOICE MAIL

(75) Inventors: Jeffrey Wayne Pence, Fullerton, CA (US); Minh Van Le, Mission Viejo, CA (US)

(73) Assignee: Toshiba America Information Systems, Inc., Irvine, CA (US)

( * ) Notice: Subject to any disclaimer, the term of this patent is extended or adjusted under 35 U.S.C. 154(b) by 1240 days.

(21) Appl. No.: 10/006,399

(22) Filed: Nov. 30, 2001

(65) Prior Publication Data

US 2003/0103602 A1 Jun. 5, 2003

(51) Int. Cl.
*H04M 11/00* (2006.01)
(52) U.S. Cl. .............................. 379/93.17; 379/201.04
(58) Field of Classification Search ............... 379/67.1, 379/88.13, 93.17, 915, 916, 917, 142.17, 379/201.04
See application file for complete search history.

(56) References Cited

U.S. PATENT DOCUMENTS

| | | | | |
|---|---|---|---|---|
| 5,416,831 A | * | 5/1995 | Chewning et al. | 379/93.25 |
| 5,541,986 A | * | 7/1996 | Hou | 379/201.03 |
| 5,751,793 A | * | 5/1998 | Davies et al. | 379/88.11 |
| 5,912,952 A | * | 6/1999 | Brendzel | 379/93.25 |
| 6,061,512 A | * | 5/2000 | Lin et al. | 717/168 |
| 6,064,732 A | * | 5/2000 | Pezzullo et al. | 379/396 |
| 6,266,404 B1 | * | 7/2001 | Chon et al. | 379/201.04 |
| 6,504,917 B1 | * | 1/2003 | Flint et al. | 379/93.01 |
| 6,519,635 B1 | * | 2/2003 | Champlin et al. | 709/223 |
| 6,757,372 B1 | * | 6/2004 | Dunlap et al. | 379/142.17 |

* cited by examiner

*Primary Examiner*—Fan Tsang
*Assistant Examiner*—Olisa Anwah
(74) *Attorney, Agent, or Firm*—Morrison & Foerster LLP

(57) ABSTRACT

A mechanism is disclosed for displaying, on a telephone display, actions that are appropriate for a particular context when accessing a voice mail system (VMS). These actions may vary depending on the context of a user's access to the VMS. The actions are identified by text adjacent to buttons (softkeys) on the user's telephone, and are initiated when the user pushes the softkey associated with a particular action. The softkey text corresponding to a particular state of the user's access to the VMS is identified herein as a VMS softkey template. When the VMS and a telephone switch are first initialized, template information is downloaded from the VMS to the switch, and thereafter, when the VMS is accessed by a user via a telephone, runtime instructions passed between the VMS and the switch will direct the switch to display softkey templates corresponding to a particular context within the VMS.

10 Claims, 2 Drawing Sheets

SYSTEM AND METHOD FOR INTEGRATION OF SOFTKEYS WITH VOICE MAIL

BACKGROUND OF THE INVENTION

1. Field of the Invention

The present invention relates, generally, to voice mail systems (VMSs) and, in one embodiment, to systems and methods for integrating softkey displays and functionality with VMSs accessible through a telephone interface.

2. Description of Related Art

In today's business environment, telephones are often sophisticated devices having display screens and a variety of buttons for enabling a user to perform a number of different functions. For example, as illustrated in FIG. 1, a telephone 10 may have a central LCD display 12 with buttons 14 on either side of the display 12. Two lines 16 at the top of the display 12 may be reserved as title lines, which may be used to display information such as the telephone user's name, the date, and the time.

In an example prior art system illustrated in FIG. 1, the buttons 14 adjacent to the display 12 may only be related to a telephone switch (not shown in FIG. 1) to which the telephone 10 is connected. For example, if a main menu appears on the display 12, by pushing a button 18 adjacent to text on the display 12 that reads "Internal Directory," the display will change to the "Internal Directory" menu, and a prompt will appear on the display 12 to enter a particular user name of someone connected to the same switch. By entering a portion of the user name and pressing another button adjacent to text on the display that reads "Find," if that portion of the user name is found, all users having that portion of the entered name will appear on the display. By pushing another button adjacent to text on the display that reads a particular person's name, that person may be called. By pushing the button adjacent to text on the display that reads "Back," the user may be able to enter a new portion of a user name and start the "Find" process again.

The general purpose of softkeys is to enable a limited set of buttons adjacent to the display to perform different functions, depending on the operation being performed. As users traverse through different operations, softkey systems incorporated into telephone switches provide text labels on the telephone display so that the user can know what actions are available for that particular place in the system. In the example of FIG. 1, the buttons 14 are softkeys, because as the user changes from the "Main Menu" to the "Internal Directory", the text appearing adjacent to the buttons 14 will change, and the function that will be executed by pressing a particular button 14 will be different, depending on the current menu or operation. The softkey information and text labels to be applied on the telephone display are typically stored in the telephone switch and are accessed through user communications with the switch via the telephone.

VMSs are common in today's business environment. Unlike typical simple household VMSs localized to a particular telephone line, VMSs for businesses are complex messaging systems that may be housed in one or more servers. These VMSs are capable of responding to a user's input to perform a multitude of selectable functions. When accessing such a VMS through a telephone, the use of softkeys would enable the user to quickly perform these selectable functions as the user moves from one menu or operation to another within the VMS. Thus, there exists a need for integrating softkey displays and functionality with VMSs accessible through a telephone interface.

SUMMARY OF THE INVENTION

The present invention is directed to a mechanism for displaying, on a telephone display, actions that are appropriate for a particular context when accessing the VMS. These actions may vary depending on the context of a user's access to the VMS. The actions are identified by text adjacent to buttons (softkeys) on the user's telephone, and are initiated when the user pushes the softkey associated with a particular action. The softkey text corresponding to a particular state of the user's access to the VMS is identified herein as a VMS softkey template.

When the VMS and telephone switch are first initialized, template information is downloaded from the VMS to the switch, and thereafter, when the VMS is accessed by a user via a telephone, runtime instructions passed between the VMS and the switch will direct the switch to display softkey templates corresponding to a particular context within the VMS. For example, when a user first logs into the VMS by pushing a "Messages" button, the display may prompt the user to enter a password. After logging in, the user may be presented with a menu having several options such as "play messages," "send messages," or an option to manage the mailbox. Those options would show up on the display, adjacent to particular buttons on the telephone. By pushing certain buttons, the user can initiate actions, or change the menu such that new options would appear on the display. In addition, the user may hear recorded audio prompts, directing the user to push certain keypad buttons in order to perform the same functions being displayed on the telephone screen.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention. It should be further understood that although the description provided herein primarily references the SNMP communication protocol for purposes of explanation only, embodiments of the present invention are applicable to other communication protocols as well.

Figure 1:
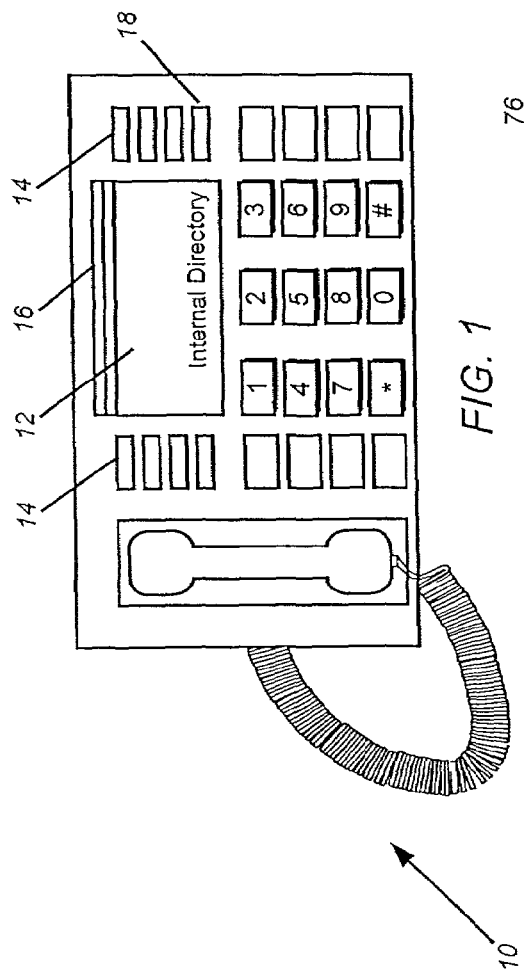
FIG. 1 illustrates a telephone unit having a display screen and softkeys.
Figure 2:
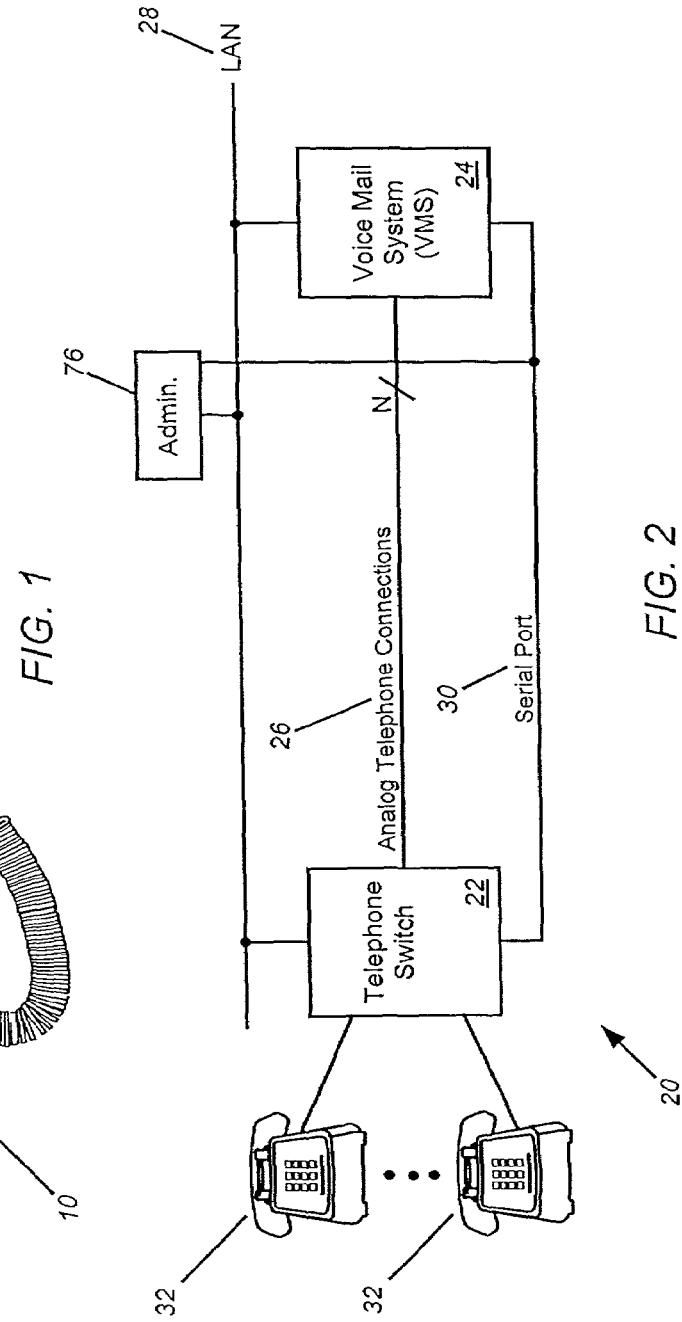
FIG. 2 illustrates an exemplary system environment for embodiments of the present invention.

FIG. 2 illustrates an exemplary system environment 20 for embodiments of the present invention. A plurality of telephones 32 are coupled for communication with a telephone switch 22. The telephone switch 22 is coupled to a VMS 24 with standard analog telephone connections 26, a Local Area Network (LAN) 28, and a serial port. Each connection may be used for a different purpose. Embodiments of the present invention are directed to interactions between the switch 22 and the VMS 24, and thus the present invention may be embodied in software resident in both the switch 22 and the VMS 24. It should be understood that the switch 22 and VMS 24 include one or more processors, memory, and associated peripheral devices (not shown in FIG. 2), and are well understood by those skilled in the art.

The present invention is related to the signaling that occurs over the LAN 28 and serial port 30, and includes three major areas, (1) the use of VMS templates to integrate VMS softkey functionality with telephone switch softkey functionality, (2) downloading the VMS templates from the VMS 24 to the switch 22 at system startup, and (3) run-time instructions between the VMS 24 and the switch 22 depending on the present context of the VMS 24.

VMS Templates

VMS softkey templates contain information related to the VMS softkeys, such as the text information to be displayed adjacent to a particular VMS softkey. Unlike telephone softkey information, which typically resides in the switch, VMS softkey information originates in the VMS. VMS softkey templates are therefore convenient and efficient for transferring VMS softkey information to the switch and integrating the VMS softkey information with the switch such that it will appear to the user that the VMS and switch are part of the same system. It should be understood that because VMS softkey templates contain all of the information needed to display VMS softkey information on a telephone display, the term "VMS softkey template" may be used herein to refer to the VMS softkey information that appears on a telephone display.

Figure 3:
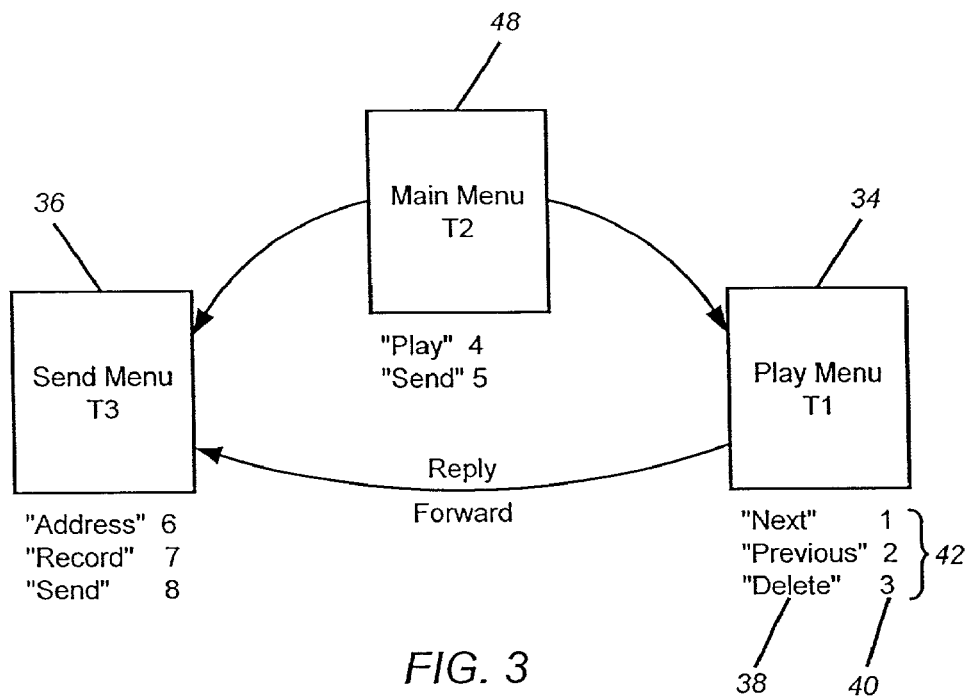
FIG. 3 is an exemplary dialogue map of a VMS according to embodiments of the present invention.

FIG. 3 is an exemplary dialogue map, which is similar to a state diagram or a state machine, of a simplified VMS according to an embodiment of the present invention. In one embodiment, the processor within the VMS may perform program steps representative of this dialogue map. However, in other embodiments, hardware implementations or combined hardware/software implementations may be used to implement the functionality represented in FIG. 3. From a main menu state 48 (the main menu of the VMS), a user may move to a play menu state 34 or a send menu state 36. From the play menu 34, a user can move to the send menu 36 if a reply or a forward action is taken. VMS templates for each of the three menu states in the example of FIG. 3 are originally stored in, and thus originate in the VMS. The VMS template information identifies a display string 38 and an action code 40 for each entry 42 in the menu. For example, the play menu 34 may have a VMS template containing a display string of "next" with an action code of "1", a display string of "previous" with an action code of "2", and a display string of "delete" with an action code of "3". The main menu 48 may have a VMS template containing a display string of "play" with an action code of "4" and a display string of "send" with an action code of "5". The send menu 36 may have a VMS template containing a display string of "address" with an action code of "6", a display string of "record" with an action code of "7", and a display string of "send" with an action code of "8". Each action code is unique within the VMS, and there may be hundreds in the system.

Note that multiple VMS templates may correspond to a single menu state. The selection of a particular VMS template for a menu state may be based on the configured options in the system. For example, if a user is in the play menu, one VMS template for the play menu may provide the user with the options "next," "previous," "delete," "save," and "exit." However, additional options may be made available to the user depending on the particular message being played. For example, a "reply" option may appear in addition to the previously mentioned options if the message contains a sender identification. If the message was anonymous, the "reply" option would not appear. In one embodiment of the present invention, two different VMS templates are used to provide the "reply" option or to suppress it. The VMS detects the presence or absence of a sender identification and selects the appropriate VMS template accordingly. The selection of a particular VMS template for a menu state may also be based on the type of telephone communicating with the switch. For example, the play menu state may have three VMS templates, one for a 12 softkey telephone, one for a four softkey telephone, and one for a three softkey telephone. Selection of the appropriate template is dependent on the type of telephone being used.

By downloading the VMS templates to the telephone switch, the switch can store all of the information needed to display VMS softkeys in a manner transparent to the user, such that it should appear to the user that the separate telephone switch and VMS systems are a single integrated system.

It should be understood that the action codes described above do not correspond to keys on the keypads, that the state machine and template information described above with regard to FIG. 3 is presented for purposes of illustration only, and that actual state machines and templates may be much more complex, but utilize the same basic concepts of action codes and display strings as described above.

Template Information Provided to Switch at Startup

As noted above, because the VMS templates originate in the VMS, the switch initially stores no information about the various VMS states, templates, and options available in each state. However, by downloading VMS templates from the VMS to the switch, the VMS can provide the switch with template information, and also when to display the template. The templates therefore provide the switch with a database of displays. Rather than downloading individual VMS templates to the switch in a real-time, as-needed basis, which can be a time consuming process, one embodiment of the present invention downloads all VMS templates from the VMS to the switch at system startup for more efficient access to the VMS softkeys.

Downloading all VMS templates at system startup completely replaces all previously stored VMS templates. This provides a measure of configuration control. For example, if the version of the VMS is updated, by restarting the VMS system, the new versions of the VMS templates will be downloaded to the switch, replacing all previous VMS templates and ensuring that the switch contains the latest version of all VMS templates.

Referring again to FIG. 2, when the switch 22 and VMS 24 are first initialized at system startup, in one embodiment of the present invention the templates are downloaded to the switch 22 from the VMS 24 over a network connection such as the LAN 28 in FIG. 2 by opening a socket connection and using the SNMP protocol. In one embodiment of the present invention, every VMS softkey template download from the VMS to the switch must include an SNMP manager request using the SNMP object identifier 1.3.6.1.4.1.186.1.22.3.3. The VMS templates referred to hereinabove were templates containing softkey information. However, other templates are also downloaded at startup, such as informational data templates containing information about text that might be displayed in the "title" area of the telephone display (e.g. the text "Play Menu").

Runtime Instructions

Once the VMS softkey template information has been downloaded to the switch 22, the switch 22 stores it in memory. When a call for the VMS (e.g., a user pressing the "messages" button on a telephone) arrives at the VMS 24 (i.e., when the switch 22 routes a call from a telephone 32 to the VMS 24 via one of the analog telephone connections 26), the switch 22 communicates with the VMS 24 over the serial port 30 by sending packets of data such as ASCII characters. This information may include what kind of telephone is calling, or what line is being used to call in. Note that the incoming call to the VMS must be from an internal telephone 32, because softkeys cannot be applied to outside callers. (The VMS may also be accessed by outside callers by calling in through the switch, but softkeys would be inapplicable in that circumstance.)

The incoming call from an internal phone 32 may be for the purpose of retrieving messages, sending messages, or to change forwarding options, etc. The VMS 24 will respond with the identity of one of the softkey templates and the identity of a data template, based on the state of the VMS 24. For example, when a call first arrives and the main menu state is needed, the VMS 24 will send the identity of the softkey template for "play" and "send", and a data template for displaying "Main Menu" in the title area of the display.

Figure 4:
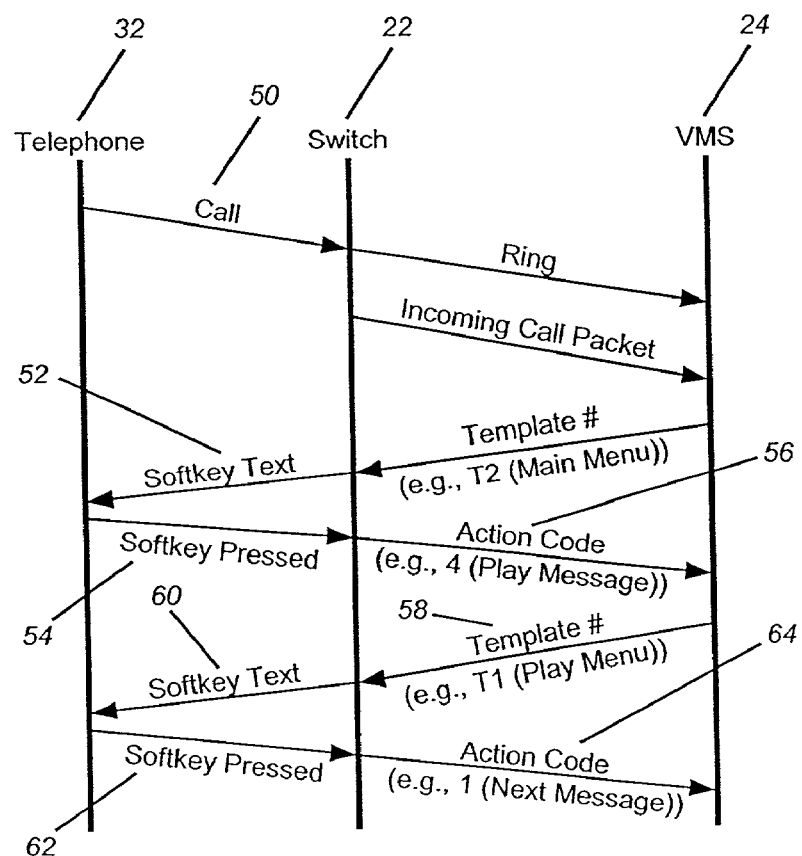
FIG. 4 illustrates an interaction diagram of exemplary runtime instructions passed between the VMS and the switch according to an embodiment of the present invention.

FIG. 4 illustrates an interaction diagram of exemplary runtime instructions passed between the telephone 32, the VMS 24, and the switch 22 according to an embodiment of the present invention. In one embodiment of the present invention, the runtime instructions are communicated over a serial port such as the serial port 30 in FIG. 2. Using the serial port 30 rather than the LAN 28 to communicate the runtime instructions is advantageous because collisions between the runtime instructions and other premises network traffic are avoided. Such collisions may create delays, especially when large files are being downloaded over the network. By using the serial port for runtime instructions, calls to the VMS can be identified and VMS softkeys can be displayed without delay.

Referring again to FIG. 4, when a call 50 for the VMS 24 arrives at the switch 22 from the telephone 32, the switch 22 will ring 44 on one of the analog telephone ports, and at the same time send an incoming call packet 46 over the serial port. After the user logs in to the VMS 24 (not shown in FIG. 4) by entering some identifying information and a passcode, for example, the VMS 24 will send back only a main menu template number 48 such as T2, for example (see FIG. 3) on the serial port, because the switch 22 already stored the actual template in its memory at the time of the previously described download. As previously noted, communicating only the VMS template number to the switch is more efficient and faster than downloading the entire VMS template during runtime. The softkey text (display strings) 52 will then be transmitted to the telephone 32 via a digital telephone interface proprietary to the telephone switch manufacturer, and become visible on the telephone display. The switch 22 may concurrently play an audio message instructing the user to press certain keys to invoke certain functions (e.g., "to play your messages, press 1, to send a message, press 2"). Hardware and software in the VMS 24 may be utilized to play back these audio messages to the calling telephone via an audio connection (a trunk; not shown in FIG. 4) established from the VMS 24 through the analog lines and the switch 22.

After the softkey text is displayed at the telephone 32, the user may press one of the softkeys such as the "play" softkey, for example, to play messages, and this softkey command is communicated back to the switch 22 (see reference character 54). The switch 22 will then send back the action code 56 of the "play" softkey (4), for example, to the VMS 24. The VMS 24 utilizes internal logic and validates that the action code 56 is proper for the particular menu being displayed, and if it is validated, determines that the "play" softkey was pressed (because it received the "play" action code). In the present example, the VMS 24 would then transfer to the play menu state. The VMS 24 will then send back the appropriate template number 58 (T1 in the present example, corresponding to the "play" menu) to the switch 22, over the serial port. The softkey text 60 (display strings "next," "previous," and "delete" for the "play" menu in the present example) will then be transmitted to the telephone 32 and become visible on the telephone display.

If the user presses the "next" softkey, this softkey command is communicated back to the switch 22 (see reference character 62), an action code of 1 is sent back to the VMS (see reference character 64), and the process continues. It should be noted that in one embodiment of the present invention, when the "play" menu is first selected, the VMS 24 automatically begins to play the first message, so the user does not need to press the "next" softkey.

Thus, FIG. 4 illustrates that in one embodiment of the present invention, there will be an exchange of template numbers and action codes between the VMS 24 and the switch 22 over the serial port. In addition, although not shown in FIG. 4, the VMS may also send data template numbers, and occasionally literal strings are sent for display in the title area. Literal strings are appropriate for displaying a string having information that will likely change from one call to the next (e.g., "you have 5 messages in your mailbox"). Such strings cannot be downloaded as a data template, because the next user may have a different number of messages, and thus require a different string. Literal strings are generated in the VMS, and sent to the switch over the serial port when it is needed, during runtime, instead of sending a template number.

In one embodiment of the present invention, a specific format based on the SMDI protocol is used to communicate the runtime instructions between the switch and the VMS. For example, when a new call arrives, the switch will communicate a incoming call packet on the serial port via an SMDI channel, the incoming call packet containing the VMS port number assigned to the call, the type of telephone making the call, and a mailbox identifier for the caller. The VMS will receive that packet, interpret it, and send back a packet containing the template number to be displayed. Referring to FIG. 4, for example, there is a particular format for each of the incoming call, template #, and action code communications between the switch and the VMS.

In particular, in one embodiment of the present invention a DR packet is communicated from the switch to the VMS for an incoming call. The format of the DR packet is:

DR<VOICELINE><DISPLAYTYPE><MAILBOX>, where <VOICELINE> is the VMS port number assigned to the call, <DISPLAYTYPE> is the type of telephone (e.g., a 12 softkey telephone, a four softkey telephone, or a three softkey telephone), and <MAILBOX> is a voice mailbox identifier assigned to the caller. A DM packet is communicated from the VMS to the switch to display a literal string in the title area. The format of the DM packet is:

DM<VOICELINE><MAILBOX><DISPLAYSTRING>, where <DISPLAYSTRING> is the literal string to be displayed (e.g., the number of new or saved messages, and the like). A DS packet is communicated from the VMS to the switch to display a particular VMS softkey template associated with a particular VMS template number. The format of the DS packet is:

DS<VOICELINE><STEMPLATE#>, where <STEMPLATE#> is the template number of the softkey template to be displayed. A DD packet is communicated from the VMS to the switch to display a particular VMS data template associated with a particular VMS template number. The format of the DD packet is:

DD<VOICELINE><DTEMPLATE#>, where <DTEMPLATE#> is the template number of the data template to be displayed. An AC packet is communicated from the switch to the VMS to send a particular action code to the VMS. The format of the AC packet is:

AC<VOICELINE><STEMPLATE#><CODE>, where <CODE> is the action code to be communicated.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention.

What is claimed is:

1. A voice mail system (VMS) for communicating with a telephone switch to assist in displaying a VMS softkey template on a telephone display of a telephone, the telephone switch configured for transmitting a DR packet when an incoming call is received from the telephone, transmitting an AC packet containing an action code when an action is taken by a user of the telephone, receiving a DS packet containing a VMS softkey template number identifying a VMS softkey template, and displaying the VMS softkey template on the telephone display in accordance with the VMS softkey template number, the VMS comprising:

a processor programmed for
receiving the DR packet identifying the incoming call,
receiving the AC packet containing the action code of the action taken by the user,
transmitting the DS packet containing the VMS softkey template number of the VMS softkey template to be displayed,
receiving the DR packet, wherein the DR packet comprises information identifying a VMS port number assigned to the call, the type of telephone, and a voice mailbox assigned to the user,
receiving the AC packet, the AC packet further including information identifying the VMS port number assigned to the call and the VMS softkey template number of the VMS softkey template in use when the action was taken by the user, and
transmitting the DS packet, the DS packet further including information identifying the VMS port number assigned to the call.

2. The VMS as recited in claim 1, the VMS communications with the telephone switch occurring over a serial port.

3. The VMS as recited in claim 1, the telephone switch further configured for receiving a DM packet containing a VMS literal string to be displayed on the telephone display and displaying the VMS literal string on the telephone display, the processor further programmed for transmitting the DM packet containing the VMS literal string to be displayed on the telephone display.

4. The VMS as recited in claim 3, the processor further programmed for transmitting the DM packet, the DM packet further including information identifying the VMS port number assigned to the call and the voice mailbox assigned to the user.

5. The VMS as recited in claim 1, the telephone switch further configured for receiving a DD packet containing a VMS data template number identifying a VMS data template and displaying the VMS data template on the telephone display, the processor further programmed for transmitting the DD packet containing the VMS data template to be displayed on the telephone display.

6. The VMS as recited in claim 5, the processor further programmed for transmitting the DD packet, the DD packet further including information identifying the VMS port number assigned to the call.

7. A system for displaying a voice mail system (VMS) softkey template on a telephone display of a telephone, comprising:

a telephone switch for transmitting a DR packet when an incoming call is received from the telephone, transmitting an AC packet containing an action code when an action is taken by a user of the telephone, receiving a DS packet containing a VMS softkey template number identifying the VMS softkey template, and displaying the VMS softkey template on the telephone display in accordance with the VMS softkey template number; and a VMS communicatively coupled to the telephone switch, the VMS comprising a processor programmed for
receiving the DR packet identifying the incoming call,
receiving the AC packet containing the action code of the action taken by the user,
transmitting the DS packet containing the VMS softkey template number of the VMS softkey template to be displayed,
receiving the DR packet, wherein the DR packet comprises information identifying a VMS port number assigned to the call, the type of telephone, and a voice mailbox assigned to the user,
receiving the AC packet, the AC packet further including information identifying the VMS port number assigned to the call and the VMS softkey template number of the VMS softkey template in use when the action was taken by the user, and
transmitting the DS packet, the DS packet further including information identifying the VMS port number assigned to the call.

8. The system as recited in claim 7, the VMS communications with the telephone switch occurring over a serial port.

9. A method for communicating with a telephone switch to assist in displaying a VMS softkey template on a telephone display of a telephone, the telephone switch configured for transmitting a DR packet when an incoming call is received from the telephone, transmitting an AC packet containing an action code when an action is taken by a user of the telephone, receiving a DS packet containing a VMS softkey template number identifying a VMS softkey template, and displaying the VMS softkey template on the telephone display in accordance with the VMS softkey template number, the method comprising:

receiving the DR packet identifying the incoming call, receiving the AC packet containing the action code of the action taken by the user, transmitting the DS packet containing the VMS softkey template number of the VMS softkey template to be displayed, receiving the DR packet, wherein the DR packet comprises information identifying a VMS port number assigned to the call, the type of telephone, and a voice mailbox assigned to the user, receiving the AC packet, the AC packet further including information identifying the VMS port number assigned to the call and the VMS softkey template number of the VMS softkey template in use when the action was taken by the user, and transmitting the DS packet, the DS packet further including information identifying the VMS port number assigned to the call.

10. The method as recited in claim 9, the VMS communications with the telephone switch occurring over a serial port.

* * * * *